March 18, 1958     W. L. TANCRED     2,827,231
SEQUENTIAL INSPECTION MEANS FOR A PRESET SAMPLE
Filed Dec. 21, 1953     4 Sheets-Sheet 1

INVENTOR.
WILLIAM L. TANCRED
BY
Jesse A. Holton
ATTORNEY

March 18, 1958 W. L. TANCRED 2,827,231
SEQUENTIAL INSPECTION MEANS FOR A PRESET SAMPLE
Filed Dec. 21, 1953 4 Sheets-Sheet 2
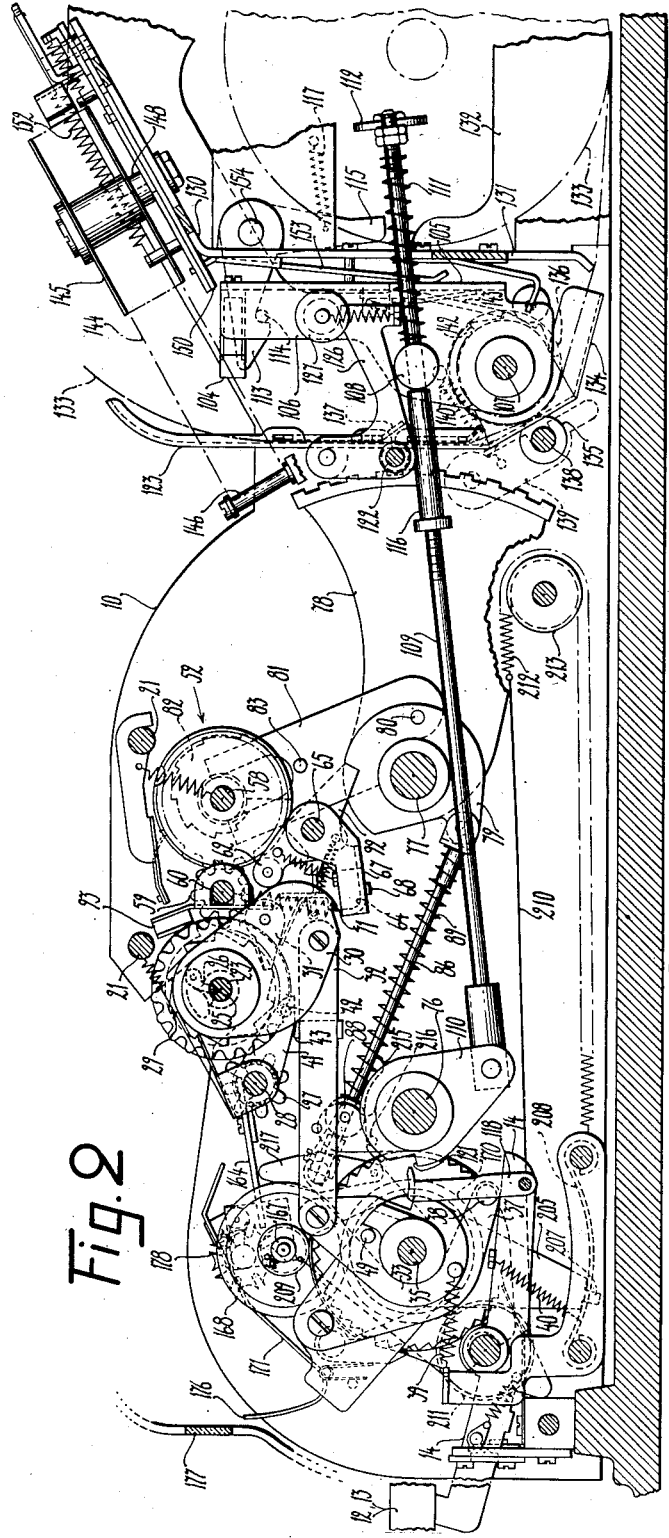
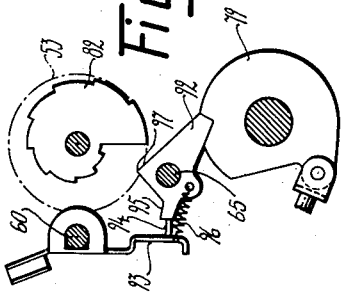
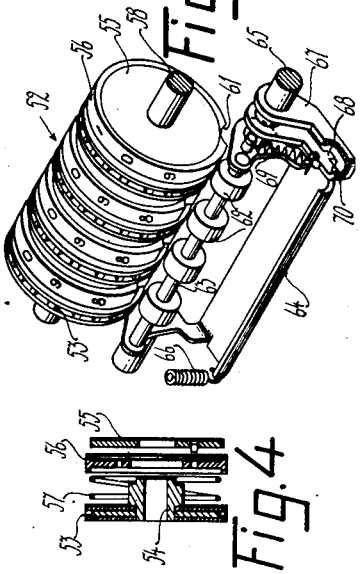
INVENTOR.
WILLIAM L. TANCRED
BY Jesse A. Holton
ATTORNEY

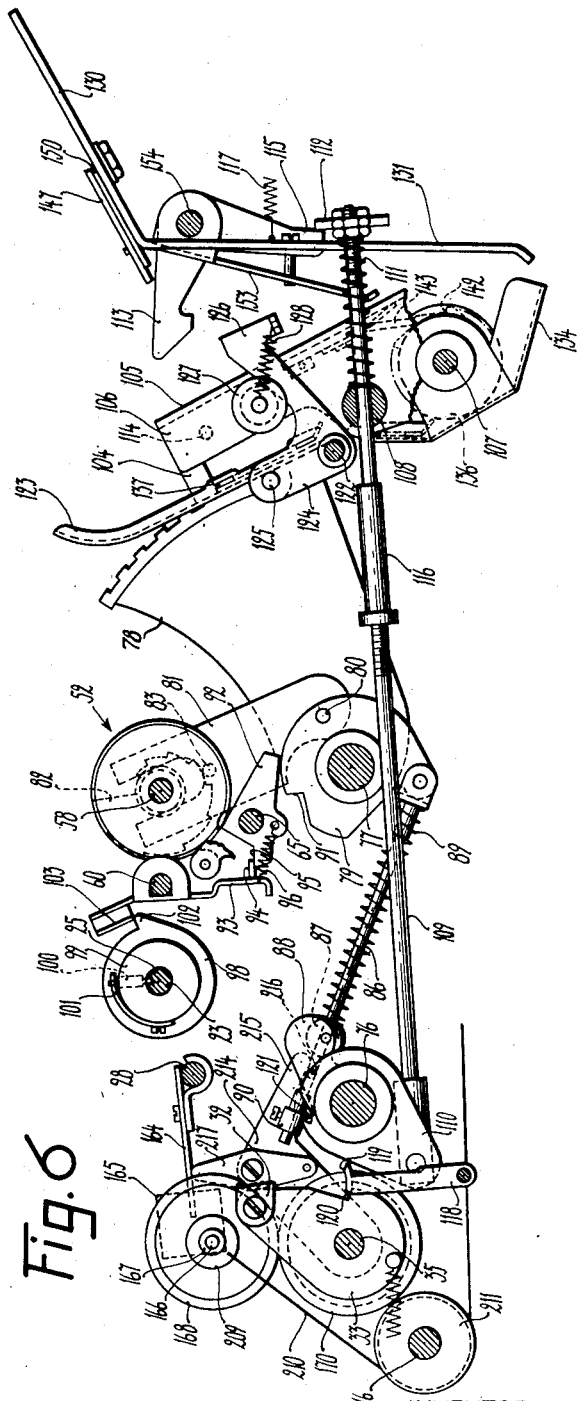

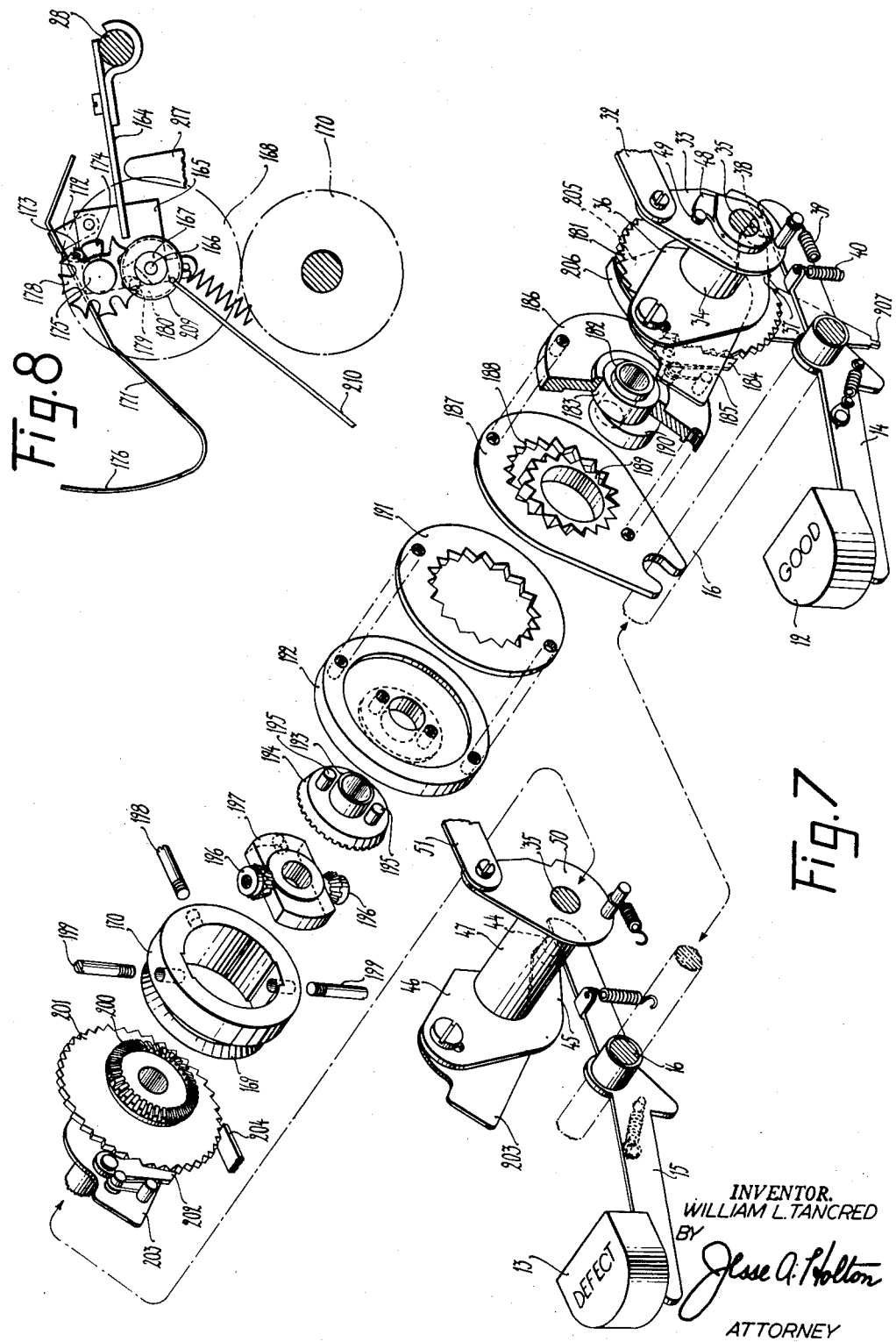

United States Patent Office 2,827,231
Patented Mar. 18, 1958

2,827,231

SEQUENTIAL INSPECTION MEANS FOR A PRESET SAMPLE

William L. Tancred, Hartford, Conn., assignor to Underwood Corporation, New York, N. Y., a corporation of Delaware Application December 21, 1953, Serial No. 399,265

4 Claims. (Cl. 235—61)

This invention relates to a device for recording data relating to the quality of various items and having signal means operable when a sampling of said items is not up to a predetermined quality.

In manufacturing operations it is common practice to take samplings from time to time, in some instances, continuously, of the parts being turned out by various automatic machines. The parts in the samples are inspected individually and if a certain percentage of them are not within specified tolerances, the machine making them must be adjusted or shut down and repaired. The number of pieces in the samples and percentage of bad parts permitted will vary according to the product in which the pieces are to be used and according to the degree of perfection it is desired to maintain. Similar control techniques are employed for grading articles animal, vegetable or mineral according to size, weight or other quality.

It is a primary object of the present invention to provide a machine which may be so operated as to indicate whether or not a preselected number of articles contains a predetermined percentage of articles of a certain quality or standard.

It is a further object of this invention to provide a machine for indicating the total number of articles in a sample and also the total number of "below quality" articles in the sample.

It is a still further object of the invention to provide a machine for making a permanent record of the total number of articles in a sample and of the total number of "below quality" articles in the sample.

It is also an object of the invention to provide a machine of the type referred to above with means for automatically locking it after a sample containing a desired total number of articles has been examined.

To accomplish these and other objects, the invention provides certain novel combinations of elements, as will become apparent as a description of a preferred embodiment thereof proceeds.

Referring now to the drawings:

Figure 2 is a side elevational view of the machine, partially in section,

Figure 1:
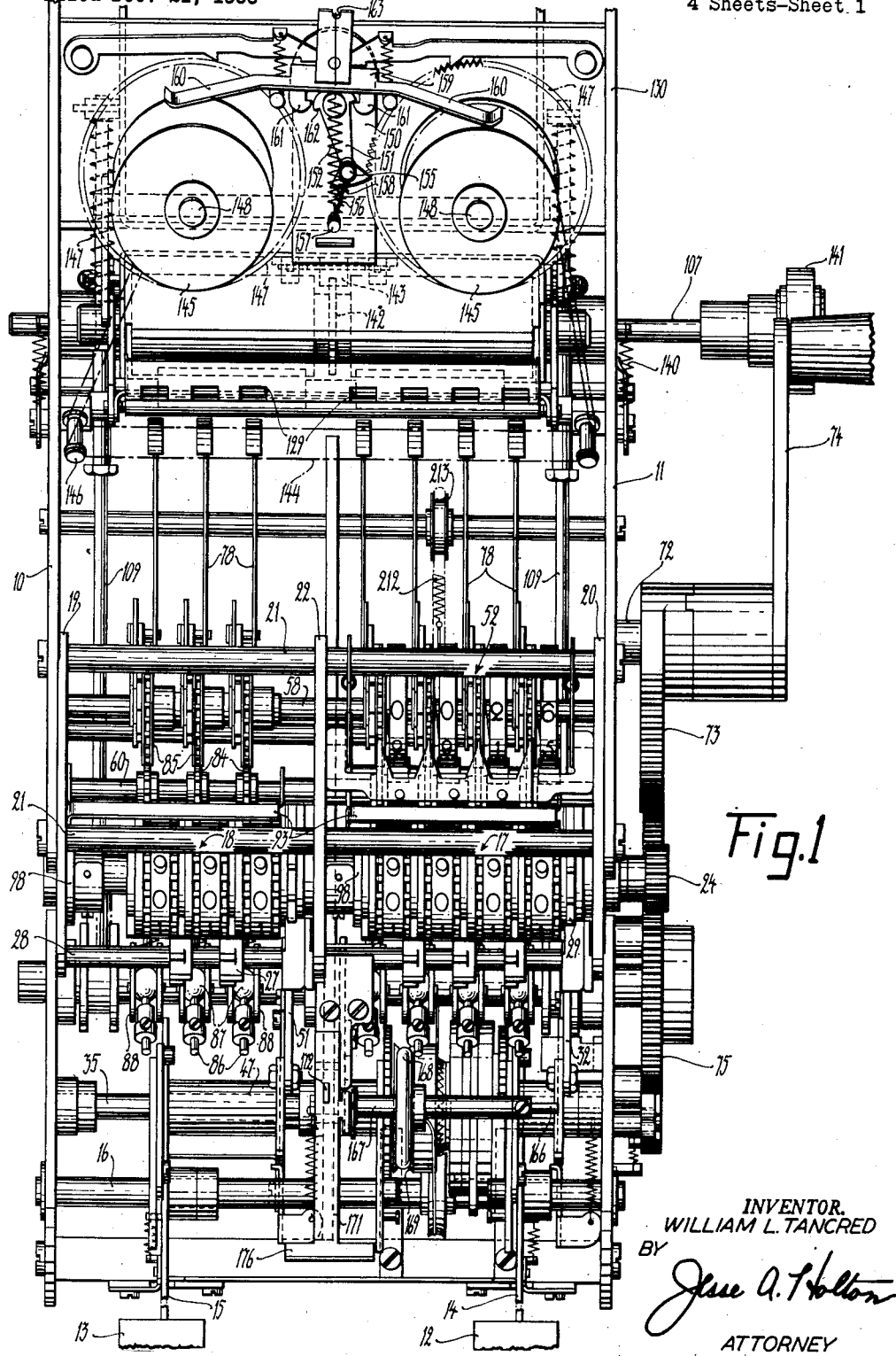
Figure 1 is a plan view of a machine embodying the invention.

Figure 3 is a perspective view of a presettable means for limiting the machine to a certain total number of operations, Figure 4 is an exploded sectional view showing the construction of the wheels of the presettable means of Figure 3, Figure 5 is a detail view of part of the means for preventing printing of insignificant zeros, Figure 6 is a side elevational view, partially in section, of the printing mechanism of the machine, Figure 7 is an exploded perspective view of a differential mechanism used in the machine, and Figure 8 is a side elevational view of a signal means operable when a predetermined percentage of articles in a sampling is not up to the desired quality.

The mechanism is mounted in a framework comprising a pair of rigid side plates 10 and 11 tied together by suitable cross members. The keyboard consists of a pair of keys 12 and 13 mounted on key levers 14 and 15 pivoted on a shaft 16 extending between the side plates. As each article in a sample is inspected, the inspector operates the appropriate key 12 or 13, which as indicated in Figure 7, may be marked "Good" and "Defect" respectively. As will presently become apparent, each operation of the "Good" key will add "one" into a counter generally designated 17 (see Figure 1) and operation of the "Defect" key will also add "one" into the counter 17, as well as into another counter generally designated at 18 (see Figure 1).

The counters 17 and 18 may conveniently be mounted in a sub-frame comprising side plates 19 and 20 tied together by suitable cross members 21, see Figure 1. An intermediate stiffening plate 22 secured to the cross members 21 may be provided if desired. The wheels of the two counters are mounted for independent rotation on a shaft 23, which shaft is rotatably mounted in the plates 19, 20 and 22, and has secured to one end thereof, outside of the framework, a pinion 24.

The particular construction of the counters is not a part of this invention and it is therefore unnecessary to describe them in detail. Suffice it to say that the shaft 23 on which the counter wheels are mounted is provided with a longitudinally extending notch 25 as shown in Figure 2, and each wheel is provided with a spring pressed pawl 26 cooperating with the notch in such manner as to permit the wheel to be rotated clockwise with respect to the shaft but not counterclockwise once the pawl is located within the notch 25. The type of counter shown herein is widely known commercially and is manufactured by Veeder Root, Inc. As is known, amounts are added by turning the lowest order wheel of the counter and as that wheel moves from "9" to "0" a carryover is made to the next wheel and so on. The carryovers are affected by mutilated pinions 27 mounted on a cross shaft 28. After an amount has been added in a counter, the wheels may be brought back to starting or zero position by rotating the shaft 23 slightly more than a full revolution in a counterclockwise direction followed by a movement of the same extent in a clockwise direction, the notch 25 picking up the pawls 26 to turn the wheels to zero during the clockwise movement of the shaft, as is well known.

For rotating the lowest order wheel of the counter 17 in an adding direction, a ratchet wheel 29 is rotatably mounted on the shaft 23 adjacent said wheel and has a one-way driving connection with said counter wheel. Rotatably mounted on the shaft 23 adjacent the ratchet wheel 29 is a member 30 having pivotally mounted thereon, a spring pressed pawl 31 engaging the teeth of the ratchet wheel. As best shown in Figures 2 and 7, a link 32 connects the member 30 to a member 33 secured to a sleeve 34 loosely mounted on a rockable shaft 35. Also connected to the sleeve 34 is a member 36 having an arm 37 carrying a pin 38 which overlies the end of the key lever 14 opposite the key 12. Springs 39 and 40 normally hold the operating linkage in the position shown in the drawings. As will readily be understood, each depression of the key 12 will rock the sleeve 34 and, through the link 32, pawl 31 and ratchet wheel 29, cause "one" to be added into the counter 17.

To insure against undesired rotation of the counter wheels, an arm 41 pivotally mounted on the carryover shaft 28 carries a pin 42 and the link 32 is provided with a collar 43, see Figure 2. With the link 32 in normal position, the collar 43 bears against the lower edge of the arm 41 to thereby press the pin 42 between adjacent teeth of the lowest order counter wheel to lock said wheel. When the key 12 is operated, the collar 43 moves away from the arm 41 and the arm drops down to remove the pin 42 from engagement with the counter wheel.

As seen in Figure 7, the end of the key lever 15 opposite the key 13 underlies a pin 44 provided on an arm 45 of a member 46 secured to one end of a sleeve 47. The sleeve 47, unlike the sleeve 34, is fixed to the rockable shaft 35. Also fixed to the shaft 35, near the opposite end thereof, is a collar having a nose 48 lying against a pin 49 secured in the member 33. Thus, each depression of the "Defect" key 13, rocks the shaft 35 and the nose 48 rocks the member 33 to operate the link 32 and cause "one" to be added into the counter 17 as heretofore described.

Fixed to the sleeve 47, is a member 50 to which is pivotally connected one end of a link 51. The opposite end of the link 51 is operatively connected to the counter 18 in the identical manner as the link 32 is operatively connected to the counter 17. Thus, each depression of the key 13, causes "one" to be added into both counters. The counter 17 therefore indicates the total number of pieces in the sample and the counter 18 indicates the number of defective or below standard pieces.

To relieve the operator or inspector of the necessity of observing the wheels of counter 17 in order to know when the desired total number of pieces have been inspected and to eliminate the necessity of precounting the pieces in the sample, the machine is equipped with means for automatically locking the keyboard after a preselected total has been accumulated in the counter 17.

For accomplishing the locking action, a third counter, generally designated 52, is provided. The wheels of this counter are somewhat different from those of the other counters and, as best shown in Figure 4, each wheel comprises a toothed member 53 having a hub 54 to which is secured a collar 55. A flanged disc 56 is rotatably mounted on the hub 54 between the member 53 and the collar 55 and a spring 57 urges the disc toward the collar so that pins on the collar will engage with holes in the disc to normally prevent rotation of the flanged disc with respect to the toothed member of the wheel. By manually pressing the flange of the disc 56 toward the toothed member, the pins in the collar 55 will become disengaged from the holes in the disc and the disc may be turned relative to the toothed member. As seen in Figure 1, the flanges of the discs 56 are provided with numbers which are arranged oppositely from the numbers on the regular counter wheels. By presetting the wheels of the counter 52 at the total number it is desired to count, that is, by manually adjusting the flanged discs 56 so that the counter will indicate that number, mechanism now to be described will be made effective to lock the keys 12 and 13 when the desired total is reached.

The wheels of the counter 52 are rotatable on a shaft 58 and the toothed members 53 thereof mesh with pinions 59 rotatable on a shaft 60 and meshed in turn with the wheels of the counter 17. Thus the wheels of the counter 52 turn with the wheels of the counter 17, but since the numbers on the counter 52 run oppositely from the numbers on the counter 17, the counter 52 may be said to subtract and, in fact, when the wheels of the counter 17 have been rotated sufficiently to show the number preset in the counter 52, the wheels of the counter 52 will have been turned to their zero positions.

The rims of the discs 56 are each provided with a cutout 61, as shown in Figure 3, and with the wheels of the counter 52 standing at zero, the cutouts are aligned with rollers 62. The rollers 62 are mounted on a shaft 63 carried by a bail member 64 pivoted on a cross shaft 65. A spring 66 urges the bail member in a direction to engage the rollers 62 with the rims of the discs 56 and, with the cutouts 61 all aligned with the rollers, the spring moves the bail member slightly in a clockwise direction about the shaft 65. Pivotally mounted on the shaft 65 adjacent one end of the bail member 64 is a member 67 having an ear 68 underlying the bail member and held in engagement therewith by means of a spring 69 extending between a tab on the member 67 and a pin on the bail member, as best seen in Figures 2 and 3. As the bail member 64 moves clockwise to position the rollers 62 in the cutouts 61, the member 67 moves with it under the urge of the spring 69 and when the key entering the last item is released, a bail portion 70 of the member 67 snaps behind a shoulder 71, see Figure 2, provided on the member 30 to prevent said member from being operated again. Since, as above pointed out, both keys 12 and 13 operate the member 30, the positioning of the bail portion 70 behind the shoulder 71 prevents further operation of either key.

When the keys become locked, the operator will know that a sample of the desired total number of articles has been completed and he may observe from the counter 17 the total number of articles inspected and from the counter 18 the number of defective or below standard articles in the sample.

Mounted on a stub shaft 72 fixed in the side plate 11, is a gear segment 73 to which is secured an operating crank 74, as shown in Figure 1. The gear segment 73 meshes with a gear segment 75 secured to a shaft 76 (Figure 2) and the gear segment 75 is meshed with the pinion 24. A forward and backward movement of the crank through its full operating range rotates the pinion 24, and the shaft 23 to which said pinion is fixed, slightly more than a full revolution in a counterclockwise direction as viewed in Figure 2 followed by a movement of the same extent in a clockwise direction. This rotation of the shaft 23 will bring the counters 17 and 18 back to zero position, as hereinbefore noted. Since the counter 52 is geared to the counter 17, the counter 52 will also be restored to its starting position and the machine is therefore conditioned for the next sampling. In the embodiment of the invention shown in the drawing, the crank 74 is hand operated but it could be operated by an electric motor if so desired.

Since this machine is ideally adapted for use in manufacturing operations, it is desirable that a permanent record be made of the results of the various samplings in order that relatively long term trends may be determined and in order also that a chief inspector may study the findings of a group of subordinate inspectors. The machine is therefore provided with means for printing the totals accumulated in the counters 17 and 18, as will now be explained.

Referring now particularly to Figures 2, 5 and 6, a stationary shaft 77 is mounted in the side plates 10 and 11 and pivotally mounted on said shaft is a group of type bars or segments 78, there being a type bar corresponding to each wheel of the counters 17 and 18 and each type bar carrying a full complement of type from "0" to "9." Secured to each type bar is a collar 79 and pivotally connected between the type bar and its collar, as by means of a pin 80, is one end of a feeler member 81 slotted at its other end to slide on a collar provided on the shaft 58. The toothed members 53 of the wheels of the counter 52 are each provided with a series of stops in the form of a stepped spiral 82 and the four right-hand (as viewed in Figure 1) feeler members 81 are each provided with a pin 83 which will contact one of the steps of the associated spiral when the feelers are raised, as will presently be explained. There is no limiting counter associated with the counter 18 but, as shown in Figure 1, the wheels of that counter mesh with pinions 84 carried by the shaft 60 and these pinions in turn mesh with toothed members 85 on the shaft 58. The toothed members 85 are each provided with a stepped spiral and the three left-hand feeler members cooperate with these spirals.

The spirals 82 are so arranged on the toothed members 53 and 85, which always turn with the wheels of the counters 17 and 18 respectively, that the steps of the spirals contacted by the pins 83 of the feeler members are those which will allow the type bars to rise to a position corresponding to the digits in the counters 17 and 18. For example, if the lowest order wheel of the counter 52 shows a "six," as it does in Figure 1, the lowest order type bar will not rise to its "six" position, but only to its "zero" position, because that is the position of the lowest order wheel of the counter 17, to which the toothed member 53 is geared.

Pivotally connected to each collar 79 is one end of a rod 86 the other end of which is slidably mounted in a collar 87 pivotally supported between a pair of arms 88 fixed to the shaft 76. A compression spring 89 is mounted on each rod 86 between the collars 79 and 87. When the machine is cycled, that is, when the crank 74 is operated, the gear segment 75 rocks the shaft 76 first from the position shown in Figure 2 to the position shown in Figure 6 and then back to the Figure 2 position. This movement of the shaft 76 causes the collars 87 carried by the arms 88 to compress the springs 89 which in turn rotate the collars 79 and swing the type bars upward until the pins 83 of the feeler members 81 contact the corresponding steps of the spirals 82 at which time the type bars are positioned for printing the amounts in the two counters 17 and 18. Collars 90 secured to the ends of the rods 86 are struck by the collars 87 during the return movement of the arms 88 and serve to positively restore the type bars to inactive position.

To prevent the printing of insignificant "zeros," the collars 79 to which the type bars are connected are notched at 91 and pawls 92 pivoted on the shaft 65 have noses normally resting in said notches. There is no pawl 92 for the lowest order of either of the sets of type bars so if the machine is cycled when both counters 17 and 18 are standing at zero, the lowest order type bars are free to rise until their feelers sense a zero, but the higher order type bars will be held in completely inactive position by the pawls 92 cooperating with the notches 91.

A pair of bail members 93 are pivoted on the pinion shaft 60 and each bail member has a plurality of ears 94 normally held against noses 95 provided on the pawls 92. Springs 96 interconnect the bails and the pawls. As best shown in Figure 5, each pawl 92 has a corner 97 positioned in the path of movement of the stepped spiral 82. When any toothed wheel 53 or 85, other than the lowest order ones, moves from its "zero" position to a significant figure position, the stepped cam 82 wipes against the corner 97 and swings the pawl 92 out of engagement with the notch in the collar 79. The spring 96 thereupon snaps the ear 94 over the top of the nose 95, as shown in Figure 6, to prevent the pawl from reentering the notch 91. The ears 94 are made progressively shorter for each higher order wheel so that the bail member can rock a little more as the higher order significant figures are reached, to hold their respective pawls out of the notches 91. There may conveniently be a bail member 93 for each of the counters 17 and 18, as indicated in Figure 1.

As best shown in Figures 1 and 6, a pair of cams 98, one for each of the bail members 93, are mounted on the counter wheel shaft 23. The cams are mounted on the shaft in a manner similar to the counter wheels and, as seen in Figure 6, each cam is provided with a hub 99 through a hole in which a plunger 100 is pressed by means of a spring 101. The inner ends of the plungers are normally positioned within the notch 25 of the shaft 23. A nose 102 of each cam lies below an ear 103 of its respective bail member 93. If any of the pawls 92 have been tripped as hereinbefore described, the ear 103 of the bail will overlie the nose 102 as shown in Figure 6. As the shaft 23 rotates counterclockwise during the first half of a cycle, the nose 102 catches on the ear 103 and the cam 98 stands still, the plunger 100 riding out of the notch 25 and as the second half cycle is begun, the radial edge of the notch 25 picks up the plunger 100 and rotates the cam 98 in a clockwise direction. Just before the end of the return movement of the shaft 23, the nose 102 wipes against the ear 103 to swing the bail member back to normal position and the springs 96 restore the pawls 92 to normal position. Should it not be worth while to prevent the printing of insignificant zeros, the pawls 92, bail members 93 and cams 98 may be omitted.

The only movement of the type segments 78 is the pivotal movement described above. For printing, the platen is pressed against the type segments, as will now be described.

Referring particularly to Figures 2 and 6, the platen is a narrow metal bar indicated at 104. It may be faced with rubber or other material if desired. The platen is secured to the upper edge of a plate 105 which is provided with a pair of flanges 106 by means of which it is mounted on a shaft 107 for limited pivotal movement. The flanges 106 have studs 108 pivotally mounted thereon and rods 109 extend through holes provided in said studs. The rods 109 are pivotally connected at their forward ends to arms 110 secured to the shaft 76. Springs 111 embrace the rods 109 between the studs 108 and enlarged collars 112 carried at the rearmost ends of said rods. A pivotally mounted latch member 113 normally engages a pin 114 on one of the flanges 106 to hold the plate 105 and the platen in the position shown in Figure 2. When the machine is cycled, the shaft 76 is first rocked clockwise, as aforesaid, and this of course draws the rods 109 forwardly and compresses the springs 111. Just before the rods reach their forwardmost position, one of the enlarged collars 112 strikes a tail portion 115 of the latch member 113 and rocks said latch member to disengage the pin 114. The springs 111 then being under compression, snap the member 105 in a counterclockwise direction to drive the platen against the type bars, as shown in Figure 6. During the second half of the cycle, the shaft 76 is rocked in a counterclockwise direction to drive the rods 109 rearwardly and sleeves 116 on said rods strike the studs 109 to restore the member 105 and the platen to normal position. A spring 117 restores the latch to latching engagement with the pin 114.

In order to prevent simultaneous entry of a number and cycling of the machine, an interponent 118, Figures 2 and 6, is pivotally mounted on the side plate 11 and is provided with an enlarged head 119 engageable with one or the other of notches 120 and 121 provided on the member 33 and arm 110 respectively. When the machine is being cycled, the early rocking of the arm 110 cams the interponent to the position shown in Figure 6, the edge of the arm holding the enlarged head 119 in engagement with the notch 120 to prevent movement of the member 33 and consequently prevent depression of either key 12 or 13. When either one of the keys is operated, the member 33 cams the interponent into engagement with the notch 121 of the arm 110 and holds it there as long as the key is held down to consequently prevent movement of said arm and cycling of the machine.

Pivotally mounted in front of the platen on a supporting shaft 122 is a thin plate 123 and, as will presently be more fully explained, the tape on which the machine prints extends between said plate and the platen. Pivoted on the shaft 122 at the edges of the plate 123 are members 124 each of which is pivotally connected to the plate at 125 and provided with an arm 126 held against a headed pin 127 on the flange 106 of the member 105 by a spring 128. As the platen swings forward to print it strikes against the plate and swings it forwardly, slots 129, see Figure 1, in said plate permitting the type to come into contact with the platen. When the platen is returned, the headed pins 127 rock the arms 126 and the members 124 to thereby restore the plate 123 to normal position.

Secured to and between the side plates 10 and 11 rearwardly of the platen is a formed plate 130, best shown in Figures 2 and 6. The plate 130 has a sloping portion upon which the ribbon spools and ribbon feed mechanism are mounted, as will later be referred to more fully. The plate 130 also has a vertically extending portion 131 and flanges 132 which provide a housing within which a roll of paper, indicated at 133 by dot-and-dash lines, may be loosely mounted. The paper is fed from the roll over a guide plate 134, between feed rolls 135 and 136 and upwardly between the thin plate 123 and another thin plate 137 carried by the plate 123 but spaced from the flat surface thereof far enough to permit the paper to pass between them. The plate 137 extends upwardly to a point just below the printing line and holds the paper in close proximity to the plate 123. The curved upper portion of the plate 123 serves to guide the paper rearwardly to prevent it from obscuring the counters and the upper edge of said plate serves as a blade to aid in tearing the printed portion of the paper from the unused portion.

The feed rolls 135 are mounted on a shaft 138 carried by arms 139 pivoted to the side plates of the machine and are held in engagement with the feed rolls 136 by means of springs 140 extending between the arms 139 and the side plates. The feed rolls 136 are fast on the shaft 107 which, as shown in Figure 1, is provided with a knob 141 by means of which the shaft and the feed rolls 136 may be turned to feed the paper whenever desired. Also secured on the shaft 107 is a ratchet wheel 142 (Figures 1, 2 and 6) and a spring urged pawl 143 carried by the platen carrying plate 105 engages the teeth of said ratchet wheel. When the plate 105 swings forward for printing, the pawl ratchets over one of the teeth of the ratchet wheel and as the plate 105 is restored, the pawl rotates said wheel the distance of a tooth space to thereby turn the shaft 107 and the feed rolls 136 sufficiently to feed the paper a line-space distance.

For supplying the ink for printing, the machine is provided with a ribbon 144 wound on a pair of spools 145 rotatably mounted on the sloping portion of the formed plate 130. The ribbon is guided by a pair of guide pins 146 to extend between the plate 123 and the type heads of the type bars or segments 78, as shown in Figures 1 and 2. The plate 123 prevents the ribbon from contacting the paper tape except through the slots 129 which are directly in line with the type and therefore prevents the ribbon from smudging the paper.

Referring now particularly to Figure 1, the ribbon spools 145 are detachably secured in a suitable manner to fine toothed discs 147 which in turn are rotatable on stub shafts 148 secured to the sloping portion of the plate 130. Slidably mounted on the plate 130 midway between the stub shafts 148 is a member 150 on which is pivotally mounted a two-toothed pawl 151. The member 150 is urged upwardly by a spring 152 and is keyed near its lower end to a member 153 pivotally mounted on a shaft 154, see Figure 2, said member 153 having a portion lying between the platen carrying plate 105 and the vertical portion 131 of the plate 130. As the platen carrying plate 105 swings forward for printing as aforesaid, the spring 152 draws the slide upward along the sloping surface of the plate 130 and as the plate 105 is restored to normal position, said plate rocks the member 153 to thereby draw the member 150 downward. During the downward movement of the member 150, the pawl 151 rotates one of the discs 147 to thereby feed the ribbon.

Pivotally connected to a pin 155 on the two-toothed pawl 151 is a small rod 156, see Figure 1, and one end of said rod slidably fits into an enlarged hole in a pin 157 secured to the member 150. A spring 158 extends between the pins 155 and 157 and the pawl 150 and the rod 156 constitute a toggle which will swing over center to engage one or the other teeth of the pawl with one of the toothed discs 147. For automatically shifting the pawl 151 to reverse the direction of ribbon feed when one of the spools 145 becomes fully wound, a swingable member 159 is pivoted on the plate 130 and is provided with a pair of feeler arms 160 and with a pair of hooks 161 for engaging one or another of a pair of shoulders 162 provided on said pawl. When a spool becomes full, the feeler arm 160 for that spool will be raised to thereby swing the member 159 in a direction to cause the hook 161 which was previously out of position to cooperate with the associated shoulder 162 of the pawl 151 to move into position to cooperate with said shoulder. During the next downward movement of the member 150, the pawl 151 will swing over to engage the other disc 147. The spring 152 which operates the member 150 is hooked into a notch 163 on the swingable member 159 and this spring moves over the pivot on which the member 159 is mounted to thereby hold said member in its new position until the other spool becomes full enough to swing the member 159 back to its first position.

The mechanism heretofore described enables the machine to record the exact number of defective pieces and the exact total number of pieces in a sample. It has been noted however, that one of the objects of the invention is to provide a machine which will indicate whether a sample contains a certain percentage of good or bad pieces, when the exact number may be of only secondary interest. The means for accomplishing this object will now be explained.

Referring particularly to Figures 2, 7 and 8, an arm 164 is pivotally mounted on the pinion shaft 28 and has secured to the free end thereof a block 165 in which is fixed one end of a shaft 166, said shaft extending cantilever style from said block, as shown in Figure 1. Loosely mounted on the shaft 166 is a sleeve 167 on which a wheel 168 is fixed. The wheel 168 is provided with a rubber or other high friction tire and normally rests in a groove 169 provided in a rotatable element 170 to thus support the block 165 in the position shown in Figures 2 and 8.

A member 171 is secured to a bail 172 which is pivotally mounted on the block 165 and, as shown in Figure 8, the member 171 is provided with a tab 173 which rests upon a cam 174 provided upon a stub shaft 175. The member 171 is thus normally supported so that an upturned end 176 thereof is below and not visible through a window 177 provided in the cover of the machine, as shown in Figure 2. The stub shaft 175 is rotatably mounted in the block 165 and has fixed thereto a star wheel 178 of a Geneva gearing. The pin 179 for operating the star wheel 178 is carried by a flange 180 secured to the sleeve 167, said sleeve cooperating with the arms of the star wheel in the usual manner. From Figure 8 it will be observed that because of the starting positions of the pin 179 and the cam 174, a slight clockwise rotation of the sleeve 167 will cause the member 171 to be swung upwardly so that the end 176 thereof will become visible through the window 177, whereas counterclockwise rotation of said sleeve less than a full revolution will merely move the pin 179 away from the star wheel 178. Since the wheel 168 is fixed to the sleeve 167 and is normally frictionally engaged with the rotatable element 170, rotation of said element, in a manner presently to be explained, will impart rotary movement to the sleeve.

Referring now particularly to Figure 7, a ratchet wheel 181 is secured to a shoulder 182 of a bearing member 183 rotatable on the hereinbefore mentioned rockable shaft 35 and said ratchet wheel is so located that the teeth thereof cooperate with a spring pressed pawl 184 pivotally mounted on an arm 185 adjustably secured to the member 36. A disc 186 has a bearing on the outer periphery of the bearing member 183 and said disc is pinned to a member 187 keyed to the shaft 16. The member 187 is provided with teeth 188 and forms the fixed internal gear of an epicyclic gear train comprising a pinion 189 rotatable on an eccentric 190 provided on the bearing member 183 and a rotatable internal gear 191 meshed with said pinion. The internal gear 191 is pinned to a disc 192 which is mounted on a collar 193 of a ring gear 194 and drivingly connected to said ring gear by pins 195. The ring gear 194 is loose on the shaft 35 and meshes with pinions 196 carried by a spider 197 secured within the rotatable element 170 by means of a set screw 198. Bearing pins 199 for the pinions 196 extend through the rotatable element 170 and screw into the spider 197. The pinions 196 also mesh with a bevel gear 200 secured to a ratchet wheel 201 loose on the shaft 35. A spring pressed pawl 202 pivotally mounted on an arm 203 adjustably secured to the member 46 cooperates with the teeth of the ratchet wheel 201.

Each operation of the "Good" key 12, causes the pawl 184 to move the ratchet wheel 181 in a counterclockwise direction which will cause the pinion 189 to move in a counterclockwise orbit within the fixed internal gear 187. Movement of the pinion in a counterclockwise orbit of course causes it to rotate about its own center in a clockwise direction and drive the internal gear 191 in a clockwise direction. As the internal gear 191 rotates clockwise it turns the ring gear 194 in the same direction, which causes the spider 197 and the rotatable element 170 to move clockwise, the bevel gear 200 being held against rotation by the friction of the pawl 202 and a leaf spring 204. This clockwise movement of the element 170 drives the wheel 168 and the sleeve 167 in a counterclockwise direction, which moves the pin 179 away from the star wheel 178 as aforesaid.

Mounted between the ratchet wheel 181 and the disc 186 is a plate 205 having a flange 206 overlying the upper teeth of said ratchet wheel and having a tail portion 207 adjustably positionable within notches provided in an arcuate member 208, see Figure 2. The tail portion 207 is sufficiently resilient so that it may be manually disengaged from one notch in the member 208 and reengaged with another notch in said member. By thus swinging the plate 205 to position the tail portion 207 thereof in different notches of the arcuate member 208, the flange 206 will vary the point where the pawl 184 will pick up the ratchet wheel and thereby vary the rotary motion imparted to the ratchet wheel and to rotary element 170 for each operation of the key 12.

Upon each operation of the "Defect" key 13, the pawl 202 rotates the ratchet wheel 201 in a counterclockwise direction and, as will be understood, this will rotate the element 170 in a counterclockwise direction to thereby drive the wheel 168 and the sleeve 167 in a clockwise direction. The movement of the element 170 in a counterclockwise direction due to operation of the key 13 will be much greater than its clockwise movement due to the operation of the key 12 because the ratchet wheel 201 is directly connected to the bevel gear 200, whereas the ring gear 194 is connected to the ratchet wheel 181 through a gear reduction unit.

Thus each operation of the key 12 affects the Geneva gearing 178, 179 to keep the signal end 176 of the member 171 out of view and each operation of the key 13 affects the Geneva gearing to move the signal into a position where it may be seen through the window 177. If the first examined unit of a sample should be defective, the end 176 will be immediately moved into view upon operation of key 13 and, depending upon the ratio of the epicyclic train 187, 189 and 191, it will require a number of operations of the key 12 to lower the end 176. The number of operations of the key 12 required to lower the end 176 may also be changed by selectively locating the member 205 so that the ratchet wheel 181 is moved to a lesser or greater extent upon operation of said key. When the keys 12 and 13 become locked after a sample of predetermined size has been inspected, as explained above, the presence of the signal end 176 behind the window 177 will inform the operator that the sample contains more defective pieces than permitted by the schedule. Thus the percentage of defective pieces in a sample determines whether the signal will be visible or not at the end of a sample run and this percentage will remain constant regardless of the size of the sample.

As best seen in Figures 2, 6 and 8, a collar 209 is secured to the sleeve 167 and one end of a cord or string 210 is connected to said collar. The cord passes over a pulley 211 on the shaft 16 and is connected at its other end to one end of a light spring 212, said spring passing over a pulley 213 and being secured at its other end to a stationary part of the machine. The collar 209 turns with the sleeve 167 and tensions the spring 212 when the collar is moved out of its normal position.

Loosely mounted on the shaft 35 is a member 214 having an arm 215 resting upon a pin 216 provided on one of the arms 88. A member 217 secured to the member 214 underlies the arm 164 and when the machine is cycled, the rocking of the arm 88 from the Figure 2 position to the Figure 6 position causes the pin 216, by its cooperation with the arm 215, to swing the member 214 in a counterclockwise direction and the member 217 raises the arm 164. The raising of arm 164 lifts the tire of the wheel 168 from contact with the rotatable element 170 and the spring 212 thereupon turns the sleeve 167 back to its starting position.

Having thus described the invention, what is claimed is:

1. A device of the character described comprising, a first key and a second key, means for locking both keys when the combined number of operations thereof reaches a predetermined total, means for selectively varying said predetermined total, indicating means movable from a non-signaling position to a signaling position when said first key has been operated more than a predetermined percentage of the combined number of operations of both keys, mechanism for operating said indicating means, said mechanism being operable in a first direction to move said indicating means to signaling position and in a second direction to restore said indicating means to non-signaling position if it has previously been moved to signaling position or to require a greater degree of operation in said first direction in order to move said indicating means to signaling position if at that time it is in non-signaling position, means operable by said first key to operate said mechanism in its first direction, means operable by said second key to operate said mechanism in its second direction, the means operable by the first key operating said mechanism to a considerably greater extent for each operation of the key than does the means operable by the second key and means for selectively varying the extent by which each operation of the second key will operate said mechanism to thereby vary the predetermined percentage.

2. In a quality control machine, a first counter for indicating a total number of inspected articles, a second counter for indicating the number of below standard articles in the inspected total, a first manually operable means for operating the first counter only, a second manually operable means for operating both counters simultaneously, means operable by said first counter for locking both manually operable means when said first counter reaches a preselected total, means for sensing and printing the totals from each counter, signal means for indicating whether or not the total number of inspected articles contains an undesirable percentage of below standard articles, a two-directional drive for said signal means, said two-directional drive being operated directly by both said manually operable means, said first manually operable means operating said drive in the direction to move said signal means to its position for indicating that the inspected articles are up to standard, and said second manually operable means operating said drive in the direction to move said signal means to position for indicating that the inspected articles are below standard.

3. In a quality control machine, a first counter for indicating a total number of inspected articles, a second counter for indicating the number of below standard articles in the inspected total, a first manually operable means for operating the first counter only, a second manually operable means for operating both counters simultaneously, means operable by said first counter for locking both manually operable means when said first counter reaches a preselected total, means for sensing and printing the totals from each counter, signal means for indicating whether or not the total number of inspected articles contains an undesirable percentage of below standard articles, a two-directional drive for said signal means, said two-directional drive being operated directly by both said manually operable means, said first manually operable means operating said drive in the direction to move said signal means to its position for indicating that the inspected articles are up to standard, said second manually operable means operating said drive in the direction to move said signal means to position for indicating that the inspected articles are below standard, and manually operable means for quickly restoring said counters to zero and simultaneously setting said signal means in its starting position.

4. In a quality control machine, a first counter for indicating a total number of inspected articles, a second counter for indicating the number of below standard articles in the inspected total, a first manually operable means for operating the first counter only, a second manually operable means for operating both counters simultaneously, a count-limiting counter geared to said first counter, said count-limiting counter being presettable to any desired count and being actuated subtractively by said first counter, means for sensing the all-zero condition of said count-limiting counter, said means locking both said manually operable means when said count-limiting counter reaches its all-zero condition, signal means for indicating whether or not the total number of inspected articles contains an undesirable percentage of below standard articles, a two-directional drive for said signal means, said two-directional drive being operated directly by both said manually operable means, said first manually operable means operating said drive in the direction to move said signal means to its position for indicating that the inspected articles are up to standard, and said second manually operable means operating said drive in the direction to move said signal means to position for indicating that the inspected articles are below standard.

References Cited in the file of this patent

UNITED STATES PATENTS

| | | | |
|---|---|---|---|
| 879,664 | McKenzie | Feb. 18, | 1908 |
| 1,030,304 | Hollerith | June 25, | 1912 |
| 1,460,917 | Penaflor | July 3, | 1923 |
| 2,127,673 | Christian | Aug. 23, | 1938 |
| 2,153,215 | Torkelson | Apr. 4, | 1939 |
| 2,322,712 | Hazard | June 22, | 1943 |
| 2,437,048 | Salles | Mar. 2, | 1948 |
| 2,530,351 | Fales | Nov. 14, | 1950 |
| 2,531,448 | Lingenfelder | Nov. 28, | 1950 |
| 2,539,368 | Hoge | Jan. 23, | 1951 |
| 2,545,763 | Burns | Mar. 20, | 1951 |
| 2,556,374 | Koechel | June 12, | 1951 |
| 2,635,811 | Hayes | Apr. 21, | 1953 |

FOREIGN PATENTS

| | | | |
|---|---|---|---|
| 435,624 | Great Britain | Sept. 25, | 1935 |